May 14, 1946.  I. E. SIQVELAND  2,400,172
MATRIX CLAMP
Filed Dec. 14, 1942
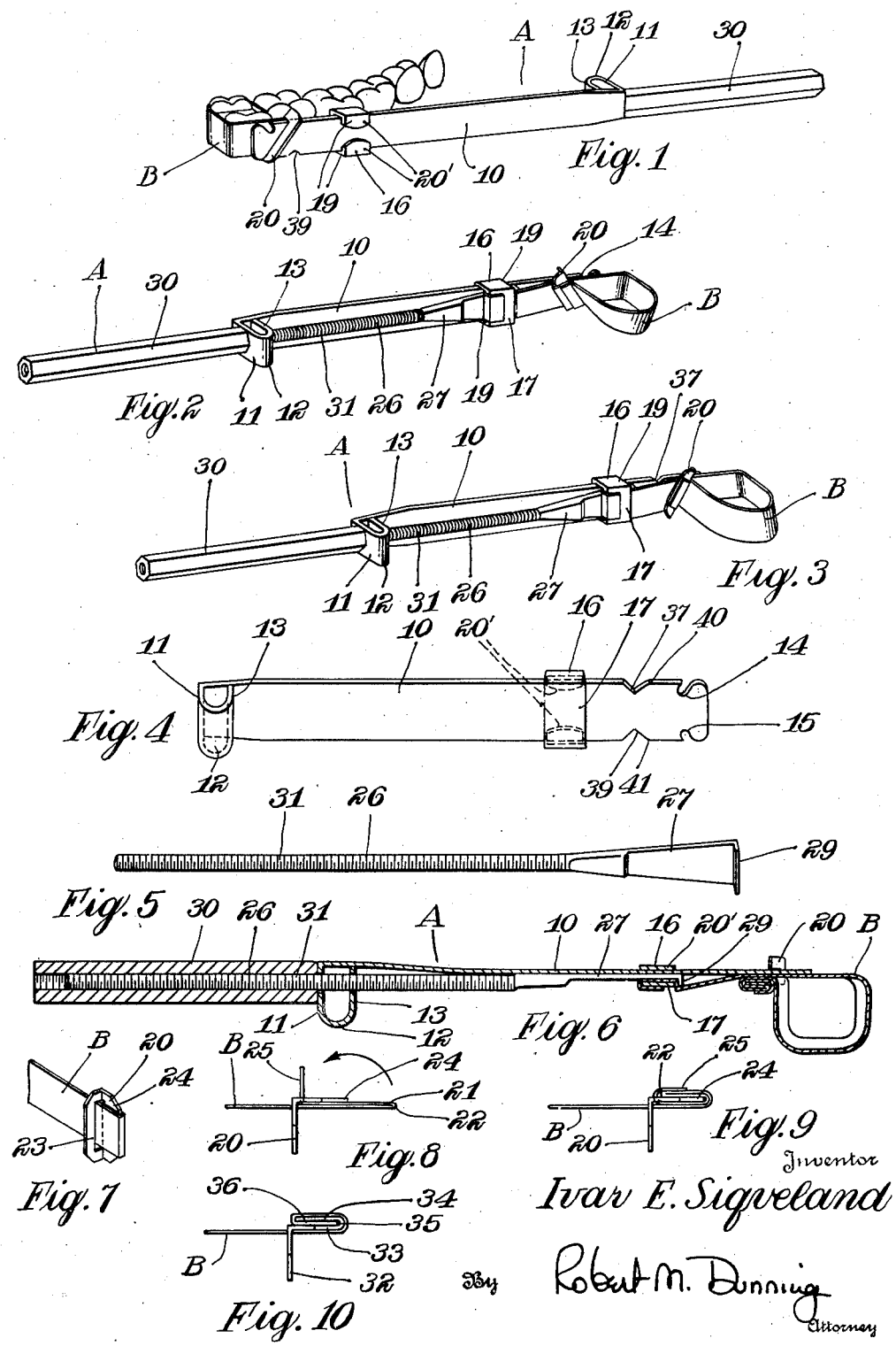

Patented May 14, 1946

2,400,172

UNITED STATES PATENT OFFICE 2,400,172

MATRIX CLAMP

Ivar E. Siqveland, St. Paul, Minn., assignor to
The Columbus Dental Manufacturing Company,
Columbus, Ohio, a corporation of Ohio Application December 14, 1942, Serial No. 468,936

12 Claims. (Cl. 32—63)

My invention relates to an improvement in matrix clamp, wherein it is desired to provide an efficient type of device for clamping a matrix strip about a tooth.

When filling a cavity in a proximal surface of a tooth it is common practice to wrap a matrix strip of light metal about the surface of the tooth so as to maintain the filling material within the confines of the tooth body and to prevent the extension of the filling into the interproximal surface between the teeth. Most matrix clamps with which I am familiar clamp the matrix strip in such a way that the strip engages the body of the tooth at the widest point of the tooth and is spaced from the tooth body at all other points. As many teeth are widest or greatest in perimeter at a point near the occlusal surface thereof the matrix strips have often been considerably spaced from the other body at the gum. Therefore if the cavity extends to a point near the gum line some of the amalgam will project from the other body after the cavity has been filled. This projecting portion of the filling, which is extremely difficult in many instances to smooth down, is extremely undesirable as it acts to catch food particles beneath the same, and also as this projecting portion may be engaged by dental floss or the like and the filling dislodged.

In order to tighten the matrix band over an inclined interproximal surface, particularly where the cavity extends from one interproximal surface to the other, it has been common practice to use wedges between the teeth and the band so as to pull the band against the tooth surfaces in the area of the cavity throughout the width of the band. This practice is not only difficult, but also painful to the patient.

It is the object of the present invention to provide a matrix clamp which engages the matrix strip or band in such a way that this strip or band may readily conform to the shape of the tooth. As a result when the band is clamped about the tooth it may assume a more or less conical shape so as to fit tightly against the interproximal surfaces of the tooth.

A feature of the present invention lies in the fact that the matrix strip will properly fit about the surface of a tooth whether the tooth is widest near the occlusal surface thereof, or widest near the gum line. As a result the clamp may operate to wrap the material tightly about the interproximal surfaces of the tooth regardless of the shape thereof.

A further feature of the present invention lies in the fact that the clamp operates with equal effectiveness on any tooth regardless of the position thereof. The matrix clamp will act with equal effectiveness when the matrix is applied to either an upper or lower tooth. As a result a single matrix clamp is required for all of the teeth.

A further feature of the present invention lies in the fact that the same matrix strip may be used for an extended period of time, it not being necessary to cut or form a different matrix strip for each individual tooth. I have found it possible to use the same matrix strip continuously for an extended period of time, resulting in a considerable saving of metal and of expense.

A further feature of the present invention lies in the provision of a matrix strip anchor which may be supported at an angle to the vertical so that a more or less cone shape form may be provided. This anchor is so arranged that it may tilt in either direction from the vertical so that the matrix strip can be adapted to the shape of any tooth regardless of its shape or size.

A further feature of the present invention lies in the fact that the matrix strip is extremely compact and can be used without discomfort to the patient. Because of the fact that the matrix strip conforms to the shape of the tooth it is not necessary to bend the matrix strip and to force the same down between the gum and the tooth. Not only is this fact important from the standpoint of comfort to the patient, but also the usual bleeding at the gum line can be avoided with this construction unless the cavity actually extends below the gum line.

A further feature of the present invention lies in the simplicity of construction of the clamp. My clamp in preferred form comprises merely five separate elements which may be either stamped from flat metal, or formed on the conventional screw machine. As a result the clamp is extremely economical and simple to manufacture.

These and other objects and novel features of my invention will be more clearly and fully set forth in the following specification and claims.

In the drawing forming a part of my specification;

Figure 1 is a perspective view of my matrix clamp in position upon a tooth to be filled.

Figure 2 is a perspective view of my clamp showing the opposite side thereof from that viewed in Figure 1.

Figure 3 is a perspective view of my clamp showing the matrix strip anchor in position to support the matrix strip for clamping engagement about a different type of tooth.

Figure 4 is a perspective view of the body of the clamp showing the construction thereof.

Figure 5 is a perspective view of the longitudinally movable matrix tightening element of my clamp.

Figure 6 is a longitudinal section through my matrix clamp and matrix strip.

Figure 7 is a perspective view of the matrix strip anchor.

Figure 8 is a diagrammatic view of the anchor showing the method of applying the matrix strip thereto.

Figure 9 is a view similar to Figure 8 showing the strip completely secured to the anchor.

Figure 10 is a view similar to Figure 9 showing a modified form of construction of anchor member.

The matrix clamp A includes a clamping body 10, the shape and form of which is best illustrated in Figure 4 of the drawing. The clamping body 10 comprises an elongated strip having a flange 11 bent outwardly from one end thereof at substantially right angles to the strip. This flange 11 is folded at 12 and the end 13 thereof extends parallel to the flange 11 and extends into abutting relation with the body of the strip 10, thus a double wall is formed to provide an effective bearing for the longitudinally movable clamping element.

The opposite end of the strip 10 from that supporting the flange 11 is provided with a pair of inclined notches 14 and 15. These notches 14 and 15 are designed to engage the anchoring member, which will be later described in detail, to support this anchoring member in tilted relation to a vertical position.

A slide clasp 16 is slidably mounted upon the body 10 to move longitudinally with respect thereto. The clasp 16 includes merely a channel-shaped element having a base 17 and opposed sides 19, as well as a pair of opposed clamping arms 20' which extend substantially parallel to the channel base 17. This clasp is freely slidable along the body 10 and is designed to engage one end of the thin metal matrix strip B.

One end of the matrix strip B is anchored to an angularly shaped anchor member 20, best illustrated in Figures 7, 8, and 9 of the drawing. As best illustrated in Figure 8 of the drawing one end 21 of the matrix strip B is folded back upon the strip at the point 22 to form a double thickness strip which is inserted through a slot or aperture 23 in the anchor member 20. After the strip B has been inserted as illustrated in Figure 8 of the drawing, the folded end 22 of the strip is folded back over the side 24 of the anchor member 20 and the extreme end 25 of the matrix strip is folded over to enclose the folded end 22 of the strip. While in the drawing the various folds in the metal matrix strip make this anchoring member and matrix strip appear rather bulky, it should be borne in mind that in actual practice the thin matrix strip may be wrapped in the manner illustrated without becoming excessively bulky.

After the matrix strip B has been anchored to the angularly shaped anchor member 20, this matrix strip B and anchoring member are attached to the clamp body 10 by extending the notched end of the body 10 through the slot 23 in the anchoring member. The slot 23 is of proper length so that the anchor member 20 when engaged in one of the notches 14 or 15 may assume a considerable angle with respect thereto. The matrix strip B is next threaded through the slot 23 between the side 24 thereof and the body 10, this matrix strip end being also threaded through the clasp 16 and being bent over the base 17 of the clasp.

The clamping member 26, best illustrated in Figure 5 of the drawing, is used to tighten the matrix strip about the tooth. This clamping member 26 is provided with a flattened end 27 which is tapered in width to extend to a width equal to or greater than the width of the matrix strip B. An outwardly projecting flange 29 is provided on the extreme end of the flattened end portion 27 for a purpose which will later be described in detail.

The flattened end 27 of the clamping member 26 extends through the clasp 16 and the matrix strip B is threaded between this flattened end 27 and the base 17 of the clasp 16. The end flange 29 engages against the inner surface of the matrix strip as best illustrated in Figure 6 of the drawing, causing an abrupt change in direction of the matrix strip and thereby resisting the tendency for the strip to pull out of the clamp. As the clamping member 26 is moved longitudinally of the body 10 the flange 29 is drawn closely adjacent the clasp 16 securely clamping the matrix strip in any adjusted position.

In order to actuate the clamping member 26 I provide a clamping nut 30 which threadably engages the threaded end 31 of the clamping member 26. By rotating the clamping nut 30 the clamping member 26 may be moved longitudinally of the body 10 pulling the matrix strip through the slot 23 in the anchoring member and wrapping the matrix strip tightly about the body of the tooth. As the anchoring member 20 is engaged at one end only, the other end of this anchoring member is free to assume any angle within limitations to conform with the shape of the tooth. When the lower end of the anchoring member 20 is engaged in the notch 15 the matrix strip B will be of smaller perimeter at its lower side than along its upper surface as illustrated in Figure 2 of the drawing. When arranged as in Figure 2 of the drawing the matrix strip is particularly adapted for clamping the matrix about the lower teeth on the right hand side of a patient's mouth. While so arranged the matrix strip is also suitably positioned for engagement with the upper teeth of the left hand side of the mouth.

When the upper end of the anchoring member 20 is engaged in the notch 14 the matrix strip will assume a shape somewhat of the nature illustrated in Figure 3 of the drawing and the matrix will thus be adapted to fit the remaining teeth in the mouth. The upper right hand teeth and the lower left hand teeth are usually so shaped as to be engaged by the matrix strip when positioned as shown in Figure 3.

In order to provide maximum angularity between the clamping body 10 and the anchor member 20, I may provide opposed notches 37 and 39 in the body 10 into which the anchor member may pivot. The anchor member 20 may pivot into the notch 39 when engaged in the notch 14; and may pivot into the notch 37 when engaged in the notch 15. This construction permits the anchor member to pivot through a considerable angularity, permitting substantial taper between the upper and lower edges of the matrix band.

The shoulders 40 and 41 adjacent the notches 37 and 39 respectively are at sufficient distance from the bases of the notches 14 and 15 to slightly resist movement of the anchor member 29 thereover. This resistance is not sufficient to impair the tightening action of the matrix band; but if the anchoring member is manually positioned engaging two diagonally positioned notches, such as the notches 14 and 39, the anchoring member will remain so inclined during the insertion of the matrix band onto a tooth. This is often an advantage when manipulating the clamp while the band is not tightened about the tooth.

In Figure 10 of the drawing I disclose an anchoring member 32 of slightly different form from that illustrated in Figures 7, 8 and 9. This anchoring member 32 is angular in shape and is slotted in the manner illustrated in Figure 7. The side 33 of the anchor 32, however, is provided with a flange 34 which folds rearwardly from the side 33 along the fold line 35. The end 36 of the matrix strip B is then clamped between the flange 34 and the side 33 and wrapped over this side and flange to extend through the slot in the anchoring member. While slightly more bulky than the constructions shown in Figures 7, 8, and 9, this construction is probably a more secure means of anchoring the matrix strip.

The manner in which the matrix strip may be adapted to the shape of a tapered tooth is believed obvious from the foregoing description. I have found that the strip will adapt itself very closely to the surface of the tooth and will provide a retaining matrix which will permit the filling of a cavity in the interproximal surface of a tooth without leaving any projecting or overhanging ledge to catch food particles or to interfere with proper cleaning of the teeth. Such ledges are often difficult or impossible to smooth down due to their inaccessibility.

In accordance with the patent statutes, I have described the principles of construction and operation of my matrix clamp, and while I have endeavored to set forth the best embodiment thereof, I desire to have it understood that obvious changes may be made within the scope of the following claims without departing from the spirit of my invention.

I claim:

1. A matrix clamp in combination with a matrix band, the clamp comprising a clamp body, angularly movable means on said clamp body for anchoring one end of said band to said clamp body in a manner to hold said band in substantially frusto-conical formation, and adjustable means on said clamp body engaging the other end of said band to wrap the same about a tooth.

2. A matrix clamp in combination with a matrix band for use in wrapping the matrix band about a tooth, the clamp including an elongated body, means adjustable along said body to which one end of said band may be attached, anchoring means swingably mounted on said body to which the other end of said band may be anchored, said anchoring means being angularly adjustable with respect to the longitudinal axis of said elongated body.

3. A matrix clamp in combination with a matrix band comprising an elongated body, means adjustable on said body and secured to one end of said matrix band, said body having opposed notches near one end thereof, and an anchoring member secured to the other end of said matrix and engageable selectively in either of said notches.

4. A matrix clamp in combination with a matrix band comprising an elongated body, means adjustable along said body to which one end of said band is secured, an anchoring member swingably mounted on said body through which said band extends, the other end of said band being secured to said anchoring member, said anchoring member being angularly adjustable with respect to said elongated body.

5. A matrix clamp in combination with a matrix band for clamping the matrix band about a tooth, the clamp comprising a clamp body, means adjustable along said body adapted to be secured to one end of the matrix band, an anchoring member having an aperture therethrough through which said clamp body extends, the matrix band passing through said aperture, and means on said anchoring member adapted to anchor the other end of said matrix band.

6. A matrix clamp in combination with a matrix band for use in wrapping the matrix band about a tooth, the clamp comprising a clamp body, means adjustable along said body to which one end of said band is adapted to be secured, an anchoring member having an aperture therethrough through which said clamp body extends, said matrix band passing through said aperture, said anchoring member including means adapted to anchor the other end of said matrix band, and means on said clamp body designed to adjustably support said anchoring member.

7. A matrix clamp in combination with a matrix band including a clamp body, adjustable means on said body designed to adjustably support one end of said matrix band, an anchoring member having an aperture therethrough through which said clamp body extends, said aperture being designed to accommodate the matrix band intermediate its ends, supporting means on said anchoring member designed to support the other end of said matrix band, and opposed notches on said clamp body arranged to hold said anchoring member angularly adjustable with respect to said clamp body.

8. A matrix clamp in combination with a matrix band including an elongated clamp strip, means adjustable along said strip designed to adjustably support one end of said matrix band, an anchoring member having an aperture therethrough through which said strip extends, the matrix band passing through said aperture, opposed notches on said strip edges designed to selectively accommodate said anchoring member to hold said anchoring member at an acute angle to the longitudinal axis of said strip, said anchoring member supporting the other end of said matrix band.

9. A matrix clamp in combination with a matrix band comprising an elongated strip, an adjustable clamping arm adjustably supported on said strip to move longitudinally along the same, an outwardly extending flange on the end of said adjustable clamping arm, a bracket extending about the end of said clamping arm adjacent said flange and said strip, said bracket being slidable along said strip, said bracket embracing an end of said matrix band between said clamping arm and said bracket, said flange on said arm engaging said band to clamp said band against said bracket, and means for anchoring the other end of said matrix band.

10. A matrix clamp in combination with a matrix band for clamping a matrix band about a tooth, the clamp comprising an elongated strip, a clamping arm adjustably slidable along said strip, a bracket encircling the end of said clamping arm and said strip, and slidable with respect thereto, said bracket being designed to embrace one end of said matrix band between said clamping arm and said bracket, a flange on the end of said clamping arm designed to clamp the matrix band against said bracket, an anchoring member having an aperture therethrough, the matrix band passing through said aperture, said anchoring member being adapted to be secured to the other end of said matrix band, and means adjustably securing said anchoring member to said strip.

11. A matrix clamp in combination with a matrix band including an elongated strip, means adjustable along said strip to which one end of said matrix band may be secured, an angularly adjustable anchoring member having an aperture therethrough, the other end of said matrix band being adapted to be secured to said anchoring member, said strip and the matrix band passing through said aperture intermediate the ends of said band, and means for adjustably securing said anchoring member to said strip.

12. A matrix band clamp comprising an elongated body, means adjustable along said body, a slotted anchoring member embracing said elongated body, and means for angularly supporting the anchoring member to said elongated body.

IVAR E. SIQVELAND.